United States Patent [19]
Patrick et al.

[11] Patent Number: 5,371,165
[45] Date of Patent: Dec. 6, 1994

[54] ORGANOPOLYSILOXANE COMPOSITIONS WHICH CROSS-LINK TO GIVE ELASTOMERS

[75] Inventors: Ekkehard Patrick, Burgkirchen; Walter Göblmeier, Rogglfing; Herbert Eck; Gerald Fleischmann, both of Burghausen, all of Germany

[73] Assignee: Wacker-Chemie GmbH, Munich, Germany

[21] Appl. No.: 186,414

[22] Filed: Jan. 26, 1994

[30] Foreign Application Priority Data

Jan. 28, 1993 [DE] Germany ............................ 4302393

[51] Int. Cl.$^5$ ............................................ C08G 77/06
[52] U.S. Cl. ........................................ 528/23; 528/25; 528/28; 525/479; 526/279

[58] Field of Search .................. 528/25, 28, 23; 525/479; 526/279

[56] References Cited

U.S. PATENT DOCUMENTS 5,063,270  11/1991  Yukimoto et al. ................. 525/479
5,250,615  10/1993  Yamamoto et al. ............... 525/479

*Primary Examiner*—Melvyn I. Marquis
*Attorney, Agent, or Firm*—Martin Connaughton

[57] ABSTRACT

The present invention provides compositions which are based on diorganopolysiloxanes that crosslink to give elastomers containing no toxic curing catalysts, e.g., tin catalysts. These elastomers have a high tensile strength and are suitable for use as coatings.

9 Claims, No Drawings

ORGANOPOLYSILOXANE COMPOSITIONS WHICH CROSS-LINK TO GIVE ELASTOMERS

FIELD OF INVENTION

The present invention relates to compositions which are based on diorganopolysiloxane and cross-link to give elastomers, and to their use.

Compositions which cross-link to give elastomers and comprise
(1) diorganopolysiloxane containing end groups capable of condensation,
(2) silane containing at least three hydrolyzable groups per molecule, and
(3) catalysts based on tin-containing compounds, such as dibutyltin dilaurate,
are known. Reference is made to Chemistry and Technology of Silicones, Walter Noll, Academic Press, Inc., 1968, pp. 395 to 397. Tin catalysts have the disadvantage of being toxic, which is not always desirable.

BACKGROUND OF INVENTION

U.S. Pat. No. 4,147,855 describes compositions which can be stored with exclusion of water and cross-link on the addition of water at room temperature to give elastomers and which comprise diorganopolysiloxane containing end groups capable of condensation, aminosilane or ketoximosilane and phosphoric acid esters. The use of acid phosphoric acid esters, that is those having hydroxyl groups, in amounts which exceed the amount neutralized by the basic nitrogen compounds liberated during the cross-linking are excluded. U.S. Pat. No. 4,147,855 also states that the acid phosphoric acid esters have the disadvantage of causing degradation of the polymers. The reference also shows elastomers that have a low tensile strength at elongation. Such elastomers are desirable for joint seals applications.

EP 246 651 discloses cross-linkable compositions which comprise organopolysiloxane containing end groups capable of condensation, tri- or tetraalkoxysilane or oligomers thereof and silyl esters of phosphoric acid. Elastomers which adhere firmly to substrates to which they have been applied are obtained, however, the strength of these elastomers is not sufficient for coatings exposed to mechanical stresses.

Therefore it is the object of the present invention to provide compositions which are based on diorganopolysiloxane and are cross-linkable giving elastomers and which contain no toxic curing catalysts, such as tin catalysts. These elastomers have a high tensile strength at elongation and are suitable for the production of coatings.

SUMMARY OF INVENTION

The present invention relates to compositions which cross-link to give elastomers and comprise
(1) A copolymer, of a diorganopolysiloxane which contains end groups capable of condensation and monomers containing aliphatic multiple bonds, produced by the copolymerization of the monomers containing aliphatic multiple bonds and the diorganopolysiloxane in the presence of free radicals,
(2) silanes of the general formula $R_xSi(OR^1)_{4-x}$, in which
R represents a monovalent, optionally halogenated hydrocarbon radical, preferably having from 1 to 20 carbon atoms per radical, $R^1$ represents a monovalent hydrocarbon radical, preferably having from 1 to 8 carbon atoms per radical, which is optionally halogenated and/or interrupted by one or more groups of the formula —O—, —S$_y$—, —O—CO—, —CO—O—, —N=, —NR$^5$—or —SIR$_2$—, and x represents 0 or 1, or an oligomer thereof,
y is 1 to 10,
with the proviso that the use of silanes which produce basic nitrogen compounds, liberated at the latest during cross-linking, in amounts which exceed those by which the phosphoric acid esters (3) are neutralized, is excluded, and
(3) phosphoric acid esters of the general formula $$O=P\begin{matrix}-OR^2\\-OR^3\\-OR^3\end{matrix},$$

which
$R^2$ represents hydrogen or a radical which can easily be split off, preferably a radical of the formula $SiR^4a(OR^4)_{3-a}$, $R^3$ is identical or different and represents a monovalent hydrocarbon radical, preferably having from 1 to 20 carbon atoms per radical, which is optionally halogenated and/or interrupted by one or more groups of the formula —O—, —Sy—, —O—CO—, —CO—O—, —N=, —NR$^5$ or —SIR$_2$—, or represents a radical which can easily be split off, preferably a radical of the formula $SiR^4a(OR^4)_{3-a}$, or the two radicals $R^3$ together represent a divalent hydrocarbon radical, preferably having from 2 to 20 carbon atoms per radical, which is optionally halogenated and/or interrupted by one or more groups of the formula —O—, —S—$_y$, —O —CO—, —CO—O—, —N=, NR$^5$ or —SIR$_2$—, $R^4$ represents a monovalent hydrocarbon radical, preferably having from 1 to 20 carbon atoms per radical, which is optionally halogenated and/or interrupted by one or more groups of the formula —O—, —S$_y$—, —O—CO—, —CO—O—, —N=, —NR$^5$ or —SIR$_2$—, $R^5$ represents hydrogen or a monovalent hydrocarbon radical, preferably having from 1 to 20 carbon atoms per radical, which is optionally halogenated and/or interrupted by one or more groups of the formula —O—, —Sy—, —O—CO—, —CO—O—, —N=, —NR$^5$ or —SIR$_2$—, and a represents 0, 1, 2 or 3,
with the proviso that up to 50 mol percent of one of the two radicals —OR$^3$ can be replaced by radicals —OH.

The present invention also relates to a process for the preparation of compositions which cross-link to give elastomers, by mixing
(1) A copolymer, of a diorganopolysiloxane which contains end groups capable of condensation and monomers containing aliphatic multiple bonds, produced by the copolymerization of the monomers containing aliphatic multiple bonds and the diorganopolysiloxane in the presence of free radicals, with (2) silanes of the general formula

in which R, $R^1$ and x have the meaning given above for these symbols, or an oligomer thereof, with the proviso that the use of silanes which produce basic nitrogen compounds, liberated at the latest during cross-linking, in amounts which exceed those by which the phosphoric acid esters (3) are neutralized, is excluded, and (3) phosphoric acid esters of the general formula

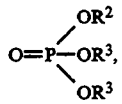

in which $R^2$ and $R^3$ have the meaning given above with the proviso that up to 50 mol percent of one of the two radicals —$OR^3$ can be replaced by radicals —OH, and, optionally (4) further substances.

In contrast to the compositions of U.S. 4,147,855, only acid phosphoric acid esters, that is those phosphoric acid esters which carry a hydroxyl group bonded to the phosphorus atom or contain a group which can easily be split off, preferably a group of the formula $SiR^4a(OR^4)_{3-a}$, bonded to the phosphorus atom, the SiOP bond being hydrolyzed in the presence of water or alcohol, are employed in the compositions according to the invention, and no neutralization of the acid phosphoric acid esters takes place, inter alia also not by the constituent (2).

Examples of monomers containing aliphatic multiple bonds are low molecular weight unsaturated aliphatic hydrocarbons, such as ethylene, propylene and butylene; vinyl halides, such as vinyl fluoride and vinyl chloride; vinyl esters of organic acids, such as vinyl acetate and vinyl versatate; styrene and ring-substituted styrenes as well as other aromatic vinyl compounds, such as vinylpyridine and vinylnaphthalene; (meth)acrylic acid and derivatives of (meth)acrylic acid, such as salts, esters, amides and the nitrile of (meth)acrylic acid, as well as methacrolein; N-vinyl compounds, such as N-vinylcarbazole, N-vinylpyrrolidone and N-vinylcaprolactam; silicon compounds containing ethylenically unsaturated groups, such as vinyltriethoxysilane and methacryloxypropyltriethoxysilane; di-substituted ethylene of the $CH_2=CX_2$ type, such as vinylidene fluoride, vinylidene chloride and vinylidene cyanide; and finally di-substituted ethylenes of the CHX=CHX type, such as vinylene carbonate; styrene and n-butyl acrylate being preferred examples.

Diorganopolysiloxane which contains end groups capable of condensation and comprises a copolymer of styrene and n-butyl acrylate which has been produced by copolymerization of styrene and n-butyl acrylate by means of free radicals in the presence of diorganopolysiloxane is preferably used as constituent (1).

Diorganopolysiloxane (1) which contains end groups capable of condensation and comprises a copolymer of monomers containing aliphatic multiple bonds, preferably styrene and n-butyl acrylate, which has been produced by copolymerization of monomers containing aliphatic multiple bonds, preferably styrene and n-butyl acrylate, by means of free radicals in the presence of diorganopolysiloxane, and its preparation are described in U.S. Pat. Nos. 3,555,109, 3,776,875, 3,631,087 and 4,032,499.

The diorganopolysiloxane reacted with monomers containing aliphatic bonds one of the general formula

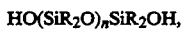

in which R has the meaning given above, and
n represents an integer having a value of from 5 to 2000, preferably 20 to 200.

Examples of radicals R are alkyl radicals, such as the methyl, ethyl, n-propyl, iso-propyl, n-butyl, iso-butyl, tert-butyl, n-pentyl, iso-pentyl, neo-pentyl, tert-pentyl radical; hexyl radicals, such as the n-hexyl radical and iso-hexyl radicals; heptyl radicals, such as the n-heptyl radical and iso-heptyl radicals; octyl radicals, such as the n-octyl radical, and iso-octyl radicals, such as the 2,2,4-trimethylpentyl radical; nonyl radicals, such as the n-nonyl radical and iso-nonyl radicals; decyl radicals, such as the n-decyl radical and iso-decyl radicals; dodecyl radicals, such as the n-dodecyl radical and iso-dodecyl radicals; octadecyl radicals, such as the n-octadecyl radical and iso-octadecyl radicals; alkenyl radicals, such as the vinyl and the allyl radical; cycloalkyl radicals, such as cyclopentyl, cyclohexyl and cycloheptyl radicals and methylcyclohexyl radicals; aryl radicals, such as the phenyl, naphthyl, anthryl and phenanthryl radical; alkaryl radicals, such as o-, m- and p-tolyl radicals, xylyl radicals, ethylphenyl radicals, o-, m- and p-vinylphenyl radicals and the nonylphenyl radical; and aralkyl radicals, such as the benzyl radical and the α- and β-phenylethyl radical.

Examples of halogenated hydrocarbon radicals R are halogenalkyl radical, such as the 3-chloro-n-propyl radical, the 3,3,3-tri-fluoro-n-propyl radical, the 2,2,2,2',2', 2'-hexafluoroisopropyl radical and the heptafluoroisopropyl radical, and halogenoaryl radicals, such as the o-, m- and p-chlorophenyl radical, Preferably, at least 80% of the number of radicals R of the diorganopolysiloxane units are methyl radicals, in particular because of easier accessibility.

The diorganopolysiloxanes in the presence of which a copolymer of monomers containing aliphatic multiple bonds, preferably styrene and n-butyl acrylate, is produced preferably have an average viscosity of 150 to 6000 mPa.s at 25° C.

The amount of diorganopolysiloxane is preferably 20 to 60% by weight, based on the total weight of diorganopolysiloxane and copolymer of monomers containing aliphatic multiple bonds, preferably styrene and n-butyl acrylate.

The copolymers which have been produced in the presence of the diorganopolysiloxane by copolymerization of styrene and n-butyl acrylate by means of free radicals preferably comprise units derived from styrene to the extent of 45 to 75% by weight and units derived from n-butyl acrylate as the remainder.

A silane of the general formula
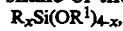

in which R and x have the meaning given above, and $R^1$ represents a monovalent hydrocarbon radical which is optionally substituted by an ether oxygen atom, preferably having from 1 to 8 carbon atoms per radical, or an oligomer thereof, is preferably used as constituent (2).

Examples of radicals $R^1$ are alkyl radicals, such as the methyl, ethyl, n-propyl, iso-propyl, n-butyl, iso-butyl, tert-butyl, n-pentyl, iso-pentyl, neo-pentyl and tert-pentyl radical; hexyl radicals, such as the n-hexyl radical and iso-hexyl radicals; heptyl radicals, such as the n-heptyl radical and iso-heptyl radicals; and octyl radicals, such as the n-octyl radical, and iso-octyl radicals, such as the 2,2,4-trimethylpentyl radical. The methyl and ethyl radicals are preferred. Examples of hydrocarbon radical $R^1$ which can be interrupted by an ether oxygen atom are the methoxyethyl, the ethoxyethyl, the methoxy-n-propyl and the methoxy-iso-propyl radical.

The cross-linking agents (2) employed in the compositions according the the present invention can be monomeric silanes or oligomers thereof, the oligomers preferably having an $SiO_2$ content of 30 to 40% by weight.

Examples of the silanes (2) employed in the compositions according to the invention or oligomers thereof are methyltriethoxysilane, tetraethoxysilane, ethyl polysilicates, such as tetraethyl silicate having an $SiO_2$ content of about 40%, which is obtainable, for example, from Wacker-Chemie GmbH, under the trade name "TES 40", isopropyl polysilicates, n-butyl polysilicates, methylbutoxydiethoxysilane, dimethyltetraethoxydisiloxane, methyltris(methoxyethoxy) silane, methyltris(methoxy-n-propoxy)silane and methyltris(methoxy-iso-propoxy)silane.

Silanes (2) or oligomers thereof are employed in the compositions according to the invention in amounts of preferably 0.1 to 30% by weight, more preferably 1 to 15% by weight, in each case based on the total weight of (1) diorganopolysiloxane which comprises a copolymer of monomers containing aliphatic multiple bonds, preferably styrene and and n-butyl acrylate.

Phosphoric acid esters of the general formula

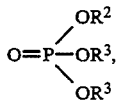

in which
$R^2$ represents hydrogen or a radical of the formula

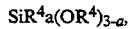

$R^3$ is identical or different and represents a monovalent hydrocarbon radical, preferably having from 1 to 20 carbon atom per radical, which is optionally halogenated and/or interrupted by one or more groups of the formula —O—, —$S_y$—, —O—CO—, —CO—O—, —N=, —$NR^5$ or —$SiR_2$—, preferably —O—, or represents a radical which can easily be split off, preferably a radical of the formula

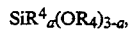

or the two radicals $R^3$ together represent a divalent hydrocarbon radical, preferably having from 2 to 20 carbon atoms per radical, $R^4$ represents a monovalent hydrocarbon radical, preferably having from 1 to 20 carbon atoms per radical, $R^5$ represents hydrogen or a monovalent hydrocarbon radical, preferably having from 1 to 20 carbon atoms per radical, and a represents 0, 1, 2 or 3, with the proviso that up to 50 mol percent of one of the two radicals —$OR^3$ can be replaced by radicals —OH, are preferably used as constituent (3).

Examples of radicals $R^3$ are alkyl radicals, such as the methyl, ethyl, n-propyl, iso-propyl, n-butyl, iso-butyl, tert-butyl, n-pentyl, iso-pentyl, neo-pentyl and tert-pentyl radical; hexyl radicals, such as the n-hexyl radical and iso-hexyl radicals; heptyl radicals, such as the n-heptyl radical and iso-heptyl radicals; octyl radicals, such as the n-octyl radical, and iso-octyl radicals, such as the 2,2,4-trimethylpentyl radical; nonyl radicals, such as the n-nonyl radical and iso-nonyl radicals; decyl radicals, such as the n-decyl radical and iso-decyl radicals; dodecyl radicals, such as the n-dodecyl radical and isododecyl radicals; octadecyl radicals, such as the n-octadecyl radical and iso-octadecyl radicals; alkenyl radicals, such as the vinyl and the allyl radical; cycloalkyl radicals, such as cyclopentyl, cyclohexyl and cycloheptyl radicals and methylcyclohexyl radicals; aryl radicals, such as the phenyl, naphthyl, anthryl and phenanthryl radical; alkaryl radicals, such as o-, m- and p-tolyl radicals, xylyl radicals, ethylphenyl radicals, o-, m- and p-vinylphenyl radicals and the nonylphenyl radical; and aralkyl radicals, such as the benzyl radical and the α- and β-phenylethyl radical.

Examples of halogenated hydrocarbon radicals $R^3$ are halogenoalkyl radicals, such as the 1,1,1-trichloroethyl radical.

Examples of the groups which interrupt hydrocarbon radicals $R^3$ are —O—, —O—CO—, —CO—O—, —$S_y$—(y=1 to 10), —N=, —$NR^5$—, —($SiR_2$—O)-$_z$—(z=1 to 100),—O—$SiR_2$—$S_y$—$SiR_2$—O—(y=1 to 10), —$SiR_2$—N=N—$SiR_2$—and —NH—CO—O—.

Examples of hydrocarbon radicals $R^3$ which are interrupted by one or more groups of the formula —O—, —S—, —C(O)O—, —N=, —$NR^5$— or —$SiR_2$ — are those of the formulae—$[CH_2CH_2O]_vR^6$, —$[CH_2CH_2CH_2O]_vR^6$ and —$[CH_2CH(CH_3)O]_vR^6$, —$CH_2CH_2O[Si(CH_3)_2O]_wCH_2CH_2OH$, in which
V is an integer having a value of from 1 to 10,
w is an integer having a value of from 1 to 20, and
$R^6$ represents hydrogen or an alkyl, alkenyl, cycloalkyl, aryl or acyl radical.

Examples of hydrocarbon radical $R^4$ are alkyl radicals, such as the methyl, ethyl, n-propyl, iso-propyl, n-butyl, iso-butyl, tert-butyl, n-pentyl, iso-pentyl, neopentyl and tert-pentyl radical; hexyl radicals, such as the n-hexyl radical and iso-hexyl radicals; heptyl radicals, such as the n-heptyl radical and iso-heptyl radicals; octyl radicals, such as the n-octyl radical, and iso-octyl radicals, such as the 2,2,4-trimethylpentyl radical; alkenyl radicals, such as the vinyl and the allyl radical; cycloalkyl radicals, such as cyclopentyl, cyclohexyl and cycloheptyl radicals and methylcyclohexyl radicals; aryl radicals, such as the phenyl and naphthyl, radical; alkaryl radicals, such as o-, m- and p-tolyl radicals, xylyl radicals, ethylphenyl radicals, o-, m-and p-vinylphenyl radicals and the nonylphenyl radical; and aralkyl radicals, such as the benzyl radical and the α- and β-phenylethyl radical.

The methyl radical is preferred as the radical $R^4$, and a preferred example of the radical of the formula $SiR4a(OR^4)_{3-a}$ is the trimethylsilyl radical.

Examples of hydrocarbon radicals $R^5$ are alkyl radicals, such as the methyl, ethyl, n-propyl, iso-propyl, n-butyl, iso-butyl, tert-butyl, n-pentyl, iso-pentyl, neopentyl and tert-pentyl radical; hexyl radicals, such as the n-hexyl radical and iso-hexyl radicals; heptyl radicals, such as the n-heptyl radical and iso-heptyl radicals; octyl radicals, such as the n-octyl radical, and iso-octyl radicals, such as the 2,2,4-trimethylpentyl radical; alkenyl radicals, such as the vinyl and the allyl radical; cycloalkyl radicals, such as cyclopentyl, cyclohexyl and cycloheptyl radicals and methylcyclohexyl radicals; aryl radicals, such as the phenyl and naphthyl radical; alkaryl radicals, such as o-, m- and p-tolyl radicals, xylyl radicals, ethylphenyl radicals, o-, m-and p-vinylphenyl radicals and the nonylphenyl radical; and aralkyl radicals, such as the benzyl radical and the α- and β-phenylethyl radical.

Hydrogen and the methyl, ethyl, hydroxyethyl and propyl radical are preferred as the radical $R^5$.

Examples of the phosphoric acid esters (3) employed in the compositions according to the invention are bis(2-ethylhexyl)phosphate, tris(trimethylsilyl) phosphate, the secondary ester of orthophosphoric acid with triethylene glycol 2-ethylhexyl ether of the formula $O=P(OH)[(OCH_2CH_2-)_3OCH_2CH(CH_2CH_2)CH_2CH_2CH_2CH_3]_2$, acid phosphoric acid esters of epoxy resins, as described in EP-A 358 096, and other phosphoric acid esters which are commercially obtainable and the composition and preparation of which are described in Marlophor®, Präzisionstenside [Precision Surfactants], Hüls AG, May 1990.

Phosphoric acid esters (3) are employed in the compositions according to the invention in amounts of preferably 0.1 to 10% by weight, and more preferably 0.5 to 5.0% by weight, in each case based on the total weight of (1) diorganopolysiloxane which comprises a copolymer of monomers containing aliphatic multiple bonds, preferably styrene and n-butyl acrylate.

In addition to (1) diorganopolysiloxane which comprises a copolymer of monomers containing aliphatic multiple bonds, preferably styrene and n-butyl acrylate, silane (2) or oligomers thereof and phosphoric acid esters (3), other substances (4) which it has also been possible to use to date for the preparation of compositions which cross-link to give elastomers can also be used in the compositions according to the invention.

For the other substances (4), the use of substances (4) which produce basic compounds, liberated at the latest during cross-linking, in amounts which exceed those by which the phosphoric acid esters (3) are neutralized is excluded.

Examples of such additional substances (4) which can also be used are non-reinforcing fillers, that is fillers having a BET surface area of up to about 50 m$^2$/g, such as calcium carbonate, gypsum, dolomite, barium sulfate, calcium silicate, diatomaceous earth, ground quartz, zirconium silicate, zeolites, metal oxide powders, such as aluminum oxides or zinc oxides or mixed oxides thereof, silicon nitride, silicon carbide, boron nitride, powders of glass, carbon and plastic and hollow beads of glass and plastic; reinforcing fillers having a BET surface area of more than 50$^2$/g, such as pyrogenically produced silicic acid, precipitated silicic acid, carbon blacks, such as furnace black and acetylene black, and silicon/aluminum mixed oxides of high BET surface area; 30 and fibrous fillers, such as wollastonite, asbestos and synthetic fibers. The fillers mentioned can be hydrophobized, for example by treatment with longer-chain carboxylic acids, such as stearic acid, and/or organosilanes or -siloxanes or by etherification of hydroxyl groups to alkoxy groups. One type of filler or also a mixture of at least two fillers can be employed. The fillers are employed in amounts of preferably 1 to 50% by weight, more preferably 10 to 30% by weight, in each case based on the total weight of diorganopolysiloxane (1) which comprises a copolymer of styrene and n-butyl acrylate.

Other examples of such substances (4) which can additionally be used are diluents, such as alkane mixtures, benzines and liquefied gases, such as propane, butane and carbonic acid ($CO_2$); inorganic and organic pigments, such as colored pigments of any color, for example iron oxides and phthalocyanine blue, metallic effect pigments, pearlescent pigments and fluorescent pigments, and non-colored pigments, for example titanium dioxides and carbon blacks; soluble dyestuffs; rheology auxiliaries, such as thickeners and thixotropic agents, for example platelet-like silicates, which are optionally hydrophobized, such as talc, bentonites and hectorites, pyrogenically produced silicic acids, which are optionally hydrophobized, polyacrylic acid derivatives, polyurea compounds, associative thickeners, precipitated calcium carbonates, which are optionally hydrophobized, hydrogenated castor oils, carboxymethylcellulose and stearates, such as calcium stearate and aluminum stearate; corrosion inhibitors, anticorrosion and metal pigments, such as zinc phosphates, zinc dust, aluminum powder, stainless steel powder, copper powder and ion exchangers; anti-ageing agents; light stabilizers; and agents for improving adhesion of the elastomers prepared from the compositions according to the invention to the substrates on which the elastomers have been produced. The (1) diorganopolysiloxane which comprises a copolymer of monomers containing aliphatic multiple bonds, preferably styrene and n-butyl acrylate, is employed in the compositions according to the invention in the form of a dispersion in a diluent in which the diorganopolysiloxane (1) comprising the copolymer does not dissolve. Examples of such diluents are alkane mixtures, such as benzines having evaporation properties or a boiling range suitable for the application and drying.

Diluents are employed in amounts of preferably 10 to 60% by weight, and more preferably 20 to 40% by weight, in each case based on the total weight of (1) diorganopolysiloxane which comprises a copolymer of monomers containing aliphatic multiple bonds, preferably styrene and n-butyl acrylate.

The compositions according to the invention are prepared by mixing constituents (1), (2) and (3) and, optionally, substances (4) which can additionally be used.

The compositions according to the invention are preferably compositions which are prepared more or less directly before their final shaping by mixing at least two components, or so-called two-component systems or multi-component systems. In two-component systems, constituents (1) and (2) can be in the first component and constituent (3) can be in the second components, or constituent (1) can be in the first component and constituents (2) and (3) can be in the second component, the latter being preferred. Constituents (1), (2) and (3) can also be present as individual components separately from one another.

The cross-linking of the compositions according to the invention is preferably carried out at room temperature. The cross-linking of the compositions according to the invention can be carried out at the normal moisture content of air. If desired, the cross-linking can also be carried out at higher or lower temperatures than room temperature and/or by means of concentrations of water which exceed the normal moisture content of air.

The compositions according to the invention are eminently suitable for the production of coatings. Examples of substrates onto which the coatings are applied are wood, metals, mineral building materials, such as cement and concrete, plastics, ceramics and fired clays.

The compositions according to the invention can be applied to the substrates in any desired manner which is suitable and in many cases known for the production of coatings, for example by brushing, dipping, spraying, pouring, flooding, smoothing, rolling or knife-coating.

To improve adhesion of the elastomers prepared from the compositions according to the invention to the substrates on which the elastomers are produced, the compositions according to the invention can themselves comprise an adhesion promoter, for example alkoxysilanes having reactive groups, such as the dicarboxylic acid anhydride group, acryloxyalkyl group, mercaptoalkyl group and epoxyalkyl group, oligomers thereof or mixtures of alkoxysilanes and/or oligomers thereof, or a primer is first applied to the substrates to be coated. Examples of primers are alkoxysilanes having reactive groups, such as the dicarboxylic acid anhydride group, acryloxyalkyl group, mercaptoalkyl group, epoxyalkyl group and aminoalkyl group, oligomers thereof or mixtures of alkoxysilanes and/or oligomers thereof, acrylate primers, such as silane-containing copolymers of (meth)acrylic acid esters, for example those which are commercially obtainable under the trade name "Grundierung G 901" from Wacker-Chemie GmbH.

EXAMPLE 1

(a) A mixture of 5.2 kg (50 mol) of styrene, 4.2 kg (33 mol) of n-butyl acrylate, 4.04 kg of dimethylpolysiloxane containing an Si-bonded hydroxyl group in each of the terminal units and having a viscosity of 430 mPa.s at 25° C., 0.8 kg of water and 0,141 kg of 1,1-di-tert-butylperoxy-3,3,5-trimethylcyclohexane was heated under nitrogen for 7 hours by means of a steam jacket kept at 100° C. in a polymerization vessel having an internal diameter of 312 mm and a height of 600 mm, which is fitted with an anchor stirrer operated at 200 revolutions per minute and having a width of 295 mm at the widest point, gas inlet tube and reflux condenser.

To remove un-reacted monomers and water, nitrogen was first blown through the reaction mixture at 100° C. to 130° C., and the reaction mixture was then heated at 130° C. under 16 mbar (absolute) for 3 hours. The diorganopolysiloxane thus obtained, which comprises a copolymer of styrene and n-butyl acrylate which has been produced by copolymerization of styrene and n-butyl acrylate by means of free radicals in the presence of diorganopolysiloxane, has an empirical composition of 30% of dimethylpolysiloxane, 31.5% of units derived from n-butyl acrylate and 38.5% of units derived from styrene.

(b) 1260 g of the diorganopolysiloxane which comprises a copolymer of styrene and n-butyl acrylate and the preparation of which has been described above under (a) were added to a mixture of 100 g of an alkane mixture having a boiling range of 140 to 165° C., 30 g of a pyrogenic silicic acid having a BET surface area of 200 m²/g (commercially obtainable under the trade name "HDK N 20" from Wacker-Chemie GmbH) and 7.0 g of a hydrophobic, pyrogenic silicic acid having a BET surface area of 150 m²/g (commercially obtainable under the trade name "HDK H 15" from Wacker-C.hemie GmbH). The mixture thus obtained was then diluted with a further 603 g of an alkane mixture having a boiling range from 140° to 165° C.

(c) 20.0 g of the mixture, the preparation of which has been described above under (b), were diluted with 5.0 g of an alkane mixture having a boiling range of from 140 to 165° C. A mixture of 1.8 g of a tetraethyl silicate having an $SiO_2$ content of 34% and 0.8 g of bis(2-ethylhexyl) phosphate was then added to this mixture. The mixture thus obtained was applied in a layer thickness of 100 μm to a smooth substrate using a doctor blade and stored at 23° C. and 50% relative atmospheric humidity for 2 to 3 days. The elongation at break, the tear strength and the tensile stress at 100% elongation were tested in accordance with DIN 53 504 using a standard bar S 3 A. The results are summarized in Table 1.

Comparison Example 1

The procedure of Example 1 (b) and (c) was repeated, with the modification that 13.2 g of a dimethylpolysiloxane containing an Si-bonded hydroxyl group in each of the terminal units and having a viscosity of 6000 mPa.s at 23° C. were employed instead of the 20 g of mixture comprising dimethylpolysiloxane which contains a copolymer of styrene and n-butyl acrylate, and 7.8 g instead of the 5.0 g were employed of an alkane mixture having a boiling range of from 140° to 165° C. The mechanical properties of the elastomer alkane mixture having a boiling range of from 140° to 165° C. The mechanical properties of the elastomer were determined as described in Example 1 (c). The results are summarized in Table 1.

TABLE 1

|  | Example 1 | Comparison Example 1 |
| --- | --- | --- |
| Elongation at break [%] | 200 | 110 |
| Tear strength [N/mm²] | 8.28 | 0.97 |
| Tensile strength at 100% elongation [N/mm²] | 5.06 | 0.48 |

EXAMPLE 2

The procedure of Example 1 (c) was repeated, with the modification that 0.2 g of tris(trimethylsilyl) phosphate was employed instead of the 0.8 g of bis(2-ethylhexyl) phosphate. The mechanical properties of the elastomer were determined as described in Example 1 (c). The results have been summarized in Table 2.

Comparison Example 2

The procedure of Example 2 was repeated, with the modification that 13.2 g of a dimethylpolysiloxane containing an Si-bonded hydroxyl group in each of the terminal units and having a viscosity of 6000 mPa.s at 23° C. were employed instead of the 20 g of mixture which comprises dimethylpolysiloxane which contains a copolymer of styrene and n-butyl acrylate, and 7.8 g instead of the 5.0 g were employed of an alkane mixture having a boiling range of from 140 to 165° C. The mixture was applied in a layer thickness of 100 μm to a smooth substrate using a doctor blade, as described in Example 1 (c), and was stored at 23° C. and 50% relative atmospheric humidity for 2 to 3 days. The coating was tacky, so that no mechanical properties could be determined.

TABLE 2

|  | Example 2 | Comparison Example 2 |
|---|---|---|
| Elongation at break [%] | 119 | n.d. |
| Tear strength [N/mm$^2$] | 7.76 | n.d. |
| Tensile strength at 100% elongation [N/mm$^2$] | 5.00 | n.d. | n.d. = not determinable

EXAMPLE 3

The procedure of Example 1 was repeated, with the modification that 0.8 g of the secondary ester of orthophosphoric acid with triethylene glycol 2-ethylhexyl ether (commercially obtainable under the trade name "Marlophor FC. acid" from Hüls AG) was employed instead of 0.8 g of bis(2-ethylhexyl) phosphate, and that the layer thickness was 120 μm instead of 100 μm. The mechanical properties of the elastomer were determined as described in Example 1 (c). The results have been summarized in Table 3.

Comparison Example 3

The procedure of Example 3 was repeated, with the modification that 13.2 g of a dimethylpolysiloxane containing an Si-bonded hydroxyl group in each of the terminal units and having a viscosity of 6000 mPa.s at 23° C. were employed instead of the 20 g of mixture which comprises dimethylpolysiloxane which contains a copolymer of styrene and n-butyl acrylate, and 7.8 g instead of the 5.0 g were employed of an alkane mixture having a boiling range of from 140° to 165° C.

The mechanical properties of the elastomer were determined as described in Example 1 (c). The results have been 5 summarized in Table 3.

TABLE 3

|  | Example 3 | Comparison Example 3 |
|---|---|---|
| Elongation at break [%] | 244 | 196 |
| Tear strength [N/mm$^2$] | 8.15 | 0.46 |
| Tensile strength at 100% elongation [N/mm$^2$] | 5.49 | 0.26 |

EXAMPLE 4

A diorganopolysiloxane which comprises a copolymer of styrene and n-butyl acrylate which has been produced by copolymerization of styrene and n-butyl acrylate by means of free radicals in the presence of diorganopolysiloxane, and which has an empirical composition of 40% of dimethylpolysiloxane, 33% of units derived from n-butyl acrylate and 27% of units derived from styrene was obtained by a preparation analogous to that described in Example 1 (a). A mixture was prepared analogously to Example 1 (b).

20 g of this mixture were diluted with 5 g of an alkane mixture having a boiling range of 140° to 165° C. A mixture of 1.8 g of a tetraethyl silicate having an SiO$_2$ content of 34% and 0.8 g of bis(2-ethylhexyl) phosphate was then added to this mixture. The mixture thus obtained was applied in a layer thickness of 100 μm to a smooth substrate using a doctor blade and stored at 23° C. and 50% relative atmospheric humidity for 2 to 3 days. The mechanical properties were determined as described in Example 1 (c). The results are summarized in Table 4.

TABLE 4

|  | Example 4 |
|---|---|
| Elongation at break [%] | 248 |
| Tear strength [N/mm$^2$] | 6.27 |
| Tensile strength at 100% elongation [N/mm$^2$] | 2.23 |

EXAMPLE 5

The procedure of Example 4 was repeated, with the modification that 0.2 g of tris(trimethylsilyl) phosphate was employed instead of 0.8 g of bis(2-ethylhexyl) phosphate. The mechanical properties of the elastomer were determined as described in Example 1 (c). The results are summarized in Table 5.

TABLE 5

|  | Example 5 |
|---|---|
| Elongation at break [%] | 333 |
| Tear strength [N/mm$^2$] | 6.87 |
| Tensile strength at 100% elongation [N/mm$^2$] | 2.52 |

What is claimed is:

1. A composition which cross-links to give an elastomer and comprises
   (1) A copolymer, of a diorganopolysiloxane which contains end groups capable of condensation and monomers containing aliphatic multiple bonds, produced by the copolymerization of the monomers containing aliphatic multiple bonds and the diorganopolysiloxane in the presence of free radicals,
   (2) silanes of the general formula $$R_xSi(OR_1)_{4-x}$$

in which
   R represents a monovalent, optionally halogenated hydrocarbon radical,
   R$^1$ represents a monovalent hydrocarbon radical, which is optionally halogenated and/or interrupted by one or more groups of the formula —O—, —S$_y$—, —O—CO—, —CO—O—, —CO—O—, —N=, —NR$^5$— or —SiR$_2$, and
   x represents 0 or 1, or an oligomer thereof,
   y is 1 to 10,
   with the proviso that the presence of silanes which produce basic nitrogen compounds, liberated at the latest during cross-linking, in amounts which exceed those by which the phosphoric acid esters (3) are neutralized, is excluded, and
   (3) phosphoric acid esters of the general formula $$O=P\begin{matrix}OR^2\\OR^3\\OR^3\end{matrix}$$

in which

R² represents hydrogen or a radical which can easily be split off,

R³ is identical or different and represents a monovalent hydrocarbon radical, which is optionally halogenated and/or interrupted by one or more groups of the formula —O—, —S$_y$—, —O—CO—, —CO—O—, —N=, —NR⁵ or —SiR₂—, or represents a radical which can easily be split off, or the two radicals R³ together represent a divalent hydrocarbon radical, which is optionally halogenated and/or interrupted by one or more groups of the formula —O—, —S$_y$—, —O—CO—, —CO—O—, —N=, —NR⁵ or —SiR₂—, or up to 50 mol percent of one of the two radicals —OR³ are optionally replaced by —OH radicals, R⁵ represents hydrogen or a monovalent hydrocarbon radical, which is optionally halogenated and/or interrupted by one or more groups of the formula —O—, —S$_y$—, —O—CO—, —CO—O—, —N=, —NR⁵ or —SiR₂—.

2. A composition as claimed in claim 1, wherein, in the copolymer (1), the amount of diorganopolysiloxane is 20 to 60% by weight, based on the total weight of diorganopolysiloxane and monomers containing aliphatic multiple bonds.

3. A composition as claimed in claim 1, wherein the monomers containing aliphatic multiple bonds present in the copolymer (1) are styrene and n-butylacrylate.

4. A composition as claimed in claim 3, wherein, in constituent (1), the copolymer comprises units derived from styrene to the extent of 45 to 75% by weight and units derived from n-butyl acrylate as the remainder.

5. A composition as claimed in claim 1, wherein the silane (2) of the general formula

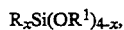
R$_x$Si(OR¹)$_{4-x}$,

R represents a monovalent, optionally halogenated hydro-carbon radical,
R¹ represents a monovalent hydrocarbon radical, which is optionally substituted by an ether oxygen atom and
x represents 0 or 1, or an oligomer thereof, is present.

6. A composition as claimed in claim 1, wherein a phosphoric acid ester of the general formula

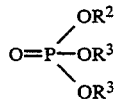

in which
R² represents hydrogen or a radical of the formula

SiR⁴$_a$(OR⁴)$_{3-a}$,
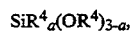

R³ is identical or different and represents a monovalent hydrocarbon radical, which is optionally halogenated and/or interrupted by one or more groups of the formula —O—, —S$_y$—, —O—CO—, —CO—O—, —N=, —NR⁵ or —SiR₂—, or a radical of the formula SiR⁴$_a$(OR⁴)$_{3-a}$, or the two radicals R³ together represent a divalent hydrocarbon radical, or up to 50 mol percent of one of the two radicals —OR³ are optionally replaced R⁴ represents a monovalent hydrocarbon radical, R⁵ represents hydrogen or a monovalent hydrocarbon radical, and
y is 1 to 10,
a represents 0, 1, 2 or 3,
is present as constituent (3).

7. A composition as claimed in claim 1, wherein the copolymer (1) is present in the composition in the form of a dispersion.

8. A process for the preparation of a composition which cross-links to give an elastomer, by mixing
(1) A copolymer, of a diorganopolysiloxane which contains end groups capable of condensation and monomers containing aliphatic multiple bonds, produced by the copolymerization of the monomers containing aliphatic multiple bonds and the diorganopolysiloxane in the presence of free radicals,
(2) silanes of the general formula

R$_x$Si(OR¹)$_{4-x}$, in which
R represents a monovalent, optionally halogenated hydrocarbon radical,
R¹ represents a monovalent hydrocarbon radical, which is optionally halogenated and/or interrupted by one or more groups of the formula —O—, —S$_y$—, —O—CO—, —CO—O—, —N=, —NR⁵— or —SiR₂—, and
x represents 0 or 1, or an oligomer thereof,
y is 1 to 10,
with the proviso that the presence of silanes which produce basic nitrogen compounds, liberated at the latest during cross-linking, in amounts which exceed those by which the phosphoric acid esters (3) are neutralized, is excluded, and
(3) phosphoric acid esters of the general formula

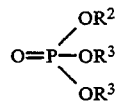

in which
R² represents hydrogen or a radical which can easily be split off,
R³ is identical or different and represents a monovalent hydrocarbon radical, which is optionally halogenated and/or interrupted by one or more groups of the formula —O—, —S$_y$—, —O—CO—, —CO—O—, —N=, —NR⁵ or —SiR₂—, or represents a radical which can easily be split off, or the two radicals R³ together represent a divalent hydrocarbon radical, which is optionally halogenated and/or interrupted by one or more groups of the formula —O—, —S$_y$—, —O—CO—, —CO—O—, —N=, —NR⁵ or —SiR₂—, or up to 50 mol percent of one of the two radicals —OR³ are optionally replaced by —OH radicals, and
R⁵ represents hydrogen or a monovalent hydrocarbon radical, which is optionally halogenated and/or interrupted by one or more groups of the formula —O—, —S—, —C(O)O—, 13 N=, —NR⁵ or —SiR₂—.

9. A coating comprising the composition as claimed in claim 1.

* * * * *

UNITED STATES PATENT AND TRADEMARK OFFICE
CERTIFICATE OF CORRECTION

PATENT NO. : 5,371,165

DATED : December 6, 1994

INVENTOR(S) : Ekkehard Patrick, Walter Goblmeier, Herbert Eck and Gerald Fleischmann It is certified that error appears in the above-identified patent and that said Letters Patent is hereby corrected as shown below:

In Claim 1, column 12, line 51, after "-O-CO-," delete "-CO-O-," which appears twice.

In Claim 6, column 13, line 66, after "optionally replaced", insert --- by -OH radicals ---.

In Claim 8, column 14, line 63, delete "13 N=," and insert in lieu of --- -N= ---.

Signed and Sealed this

Eighteenth Day of April, 1995

*Attest:*

BRUCE LEHMAN

*Attesting Officer*   *Commissioner of Patents and Trademarks*